United States Patent [19]
Sato

[11] Patent Number: 4,947,347
[45] Date of Patent: Aug. 7, 1990

[54] DEPTH MAP GENERATING METHOD AND APPARATUS

[75] Inventor: Hitoshi Sato, Utsunomiya, Japan

[73] Assignee: Kabushiki Kaisha Toshiba, Kawasaki, Japan

[21] Appl. No.: 245,152

[22] Filed: Sep. 16, 1988

[30] Foreign Application Priority Data

Sep. 18, 1987 [JP] Japan .................................. 62-234415

[51] Int. Cl.⁵ ................................................ G06F 3/14
[52] U.S. Cl. .................................... 364/522; 340/723; 340/747
[58] Field of Search ............ 364/518, 521, 522, 413.02; 340/721, 723, 729, 747, 750

[56] References Cited

U.S. PATENT DOCUMENTS

| | | |
|---|---|---|
| 3,602,702 | 8/1971 | Warnock . |
| 4,697,178 | 9/1987 | Heckel ................................ 340/729 |
| 4,710,876 | 12/1987 | Cline et al. ...................... 364/521 X |
| 4,719,585 | 1/1988 | Cline et al. ...................... 364/522 X |

FOREIGN PATENT DOCUMENTS 3831428253 4/1989 Fed. Rep. of Germany .

Primary Examiner—Gary V. Harkcom
Assistant Examiner—H. R. Herndon
Attorney, Agent, or Firm—Cushman, Darby & Cushman

[57] ABSTRACT

A depth map generating apparatus comprises a three-dimensional (3D) region setting section and first through third processors. The 3D region setting section defines and sets a 3D region of a given shape to enclose an object, the 3D region being defined in 3D coordinates. The first processor performs a coordinate computation for each pixel of the projection plane to attain a first distance in a desired view direction between a projection plane set in accordance with the view direction and the surface of the 3D region. The second processor executes a ray tracing process to attain a second distance in the view direction between the surface of the 3D region and the surface of the object. The third processor adds the first and second distances for each pixel of the projection plane.

13 Claims, 2 Drawing Sheets

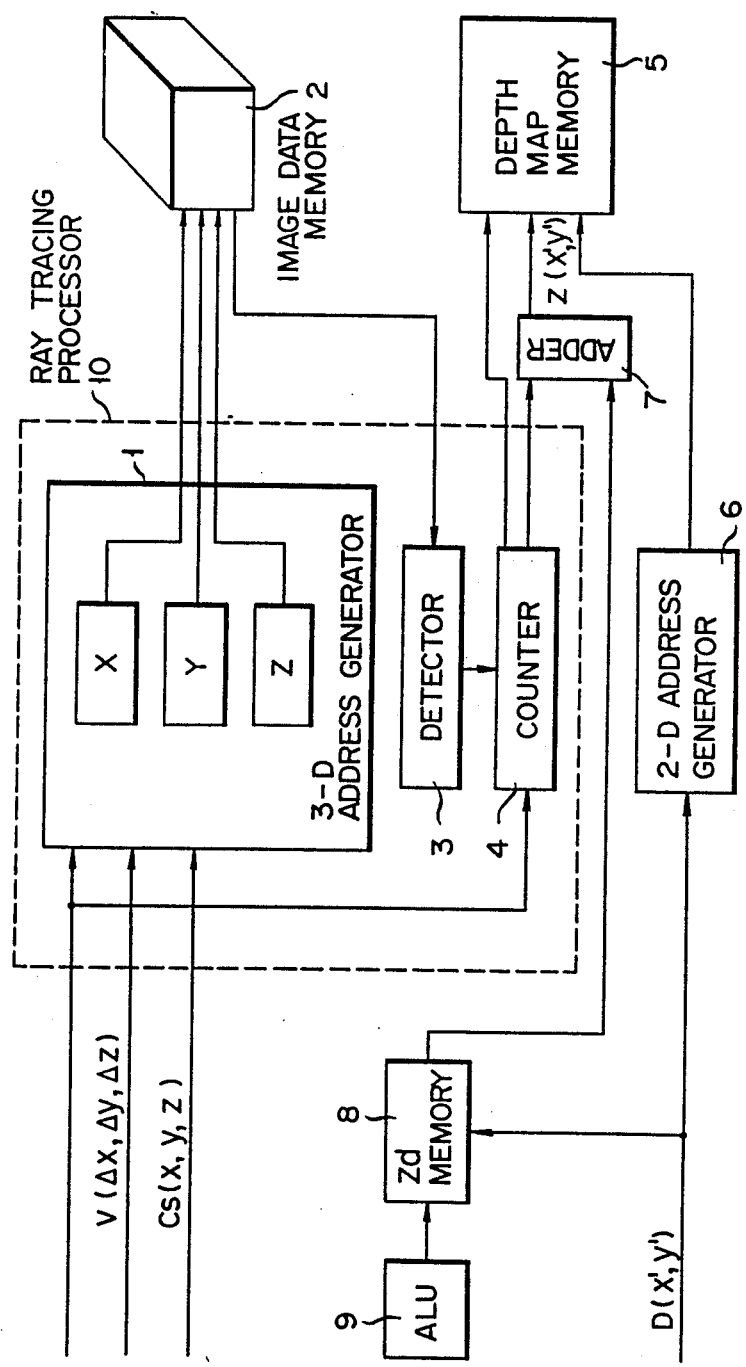
F I G. 3

DEPTH MAP GENERATING METHOD AND APPARATUS

BACKGROUND OF THE INVENTION

1. Field of the Invention

The present invention relates to a pseudo three dimensional (3D) display, i.e., perspective display of a 3D object, and, more particularly, to a depth map generating method and apparatus for generating a depth map of the 3D object, which is used in preparing the perspective display image, from 3D image data that represents the 3D object and is a collection of voxels, elements of 3D structure.

2. Description of the Related Art

There are methods and means for data processing which prepare pseudo 3D images or perspective images from 3D image data of which, like a series of adjoining computed tomography (CT) images, consists of a number of voxels representing a 3D object. The perspective image can be displayed for such analysis and discrimination of the image data as is involved in medical diagnosis.

The perspective image is prepared as follows.

First, for each pixel of a view plane forming a two dimensional (2D) field of view corresponding to the desired view direction, i.e., a projection plane, the distance from the projection plane to the surface of an object is acquired from image data of 3D structure constituted by voxels, then a depth map indicating the distribution of the distance to the object surface in the desired view direction is attained. Then, a predetermined gradation process is executed for assigning gradation like a density value to each pixel of the depth map, thereby preparing the perspective image.

In order to permit an operator to selectively change view directions on a perspective display through his operation, the above process for preparing a depth map must be repeated in an ordinary system every time the view direction is changed.

The generation of a depth map, which can be done using a general-purpose computer, normally takes a significant time, e.g., several tens of minutes since it is necessary to discriminate whether or not an object exists in the view direction for each pixel of a 2D view field for each and every voxel. In order to reduce this processing time, conventional systems often utilize a special-purpose processor that is specifically designed to execute a single type of data processing mentioned above.

Even the conventional systems using such a special-purpose processor require, for example, several seconds. This is still too long to realize true real time processing.

SUMMARY OF THE INVENTION

Accordingly, it is an object of this invention to provide depth map generating method and apparatus which overcome the above shortcomings and ensure high-speed generation of a depth map.

A depth map generating apparatus according to this invention comprises: image data memory means for storing voxel data representing a three-dimensional object;
processing means for obtaining total distances between points on a surface of said three-dimensional object and a projection plane orthogonal to a desired view direction, said processing means including:
three-dimensional region determining means for determining a three-dimensional region enclosing said three-dimensional object, whereby each of said total distances is divided into a first distance measured between said projection plane and the surface of said three-dimensional region and a second distance measured between the surface of said three-dimensional region and the surface of said three-dimensional object,
coordinate computation means for determining lengths of the first distances, with respect to each pixel on said projection plane, by coordinate computation,
ray tracing means for determining lengths of the second distances with respect to each pixel on said projection plane by ray tracing, and
adding means for adding the lengths of the first and second distances together to obtain each of said total distances, and
displaying means for displaying an image on a two-dimensional screen in a gradation corresponding to said total distances obtained by said adding means

BRIEF DESCRIPTION OF THE DRAWINGS

FIG. 3 is a schematic block diagram illustrating the arrangement of depth map generating apparatus according to the embodiment of this invention based on the above principle.

DETAILED DESCRIPTION OF THE PREFERRED EMBODIMENTS

The principle of one embodiment of this invention will be described below with reference to FIGS. 1 and 2.

Figure 1:
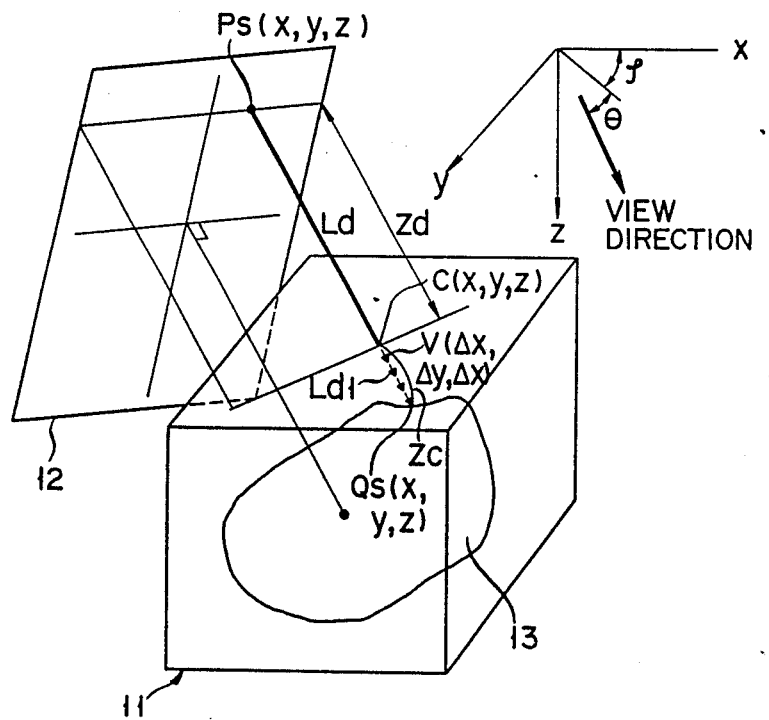
FIGS. 1 and 2 are exemplary diagrams for explaining the principle of one embodiment of this invention.
Figure 2:
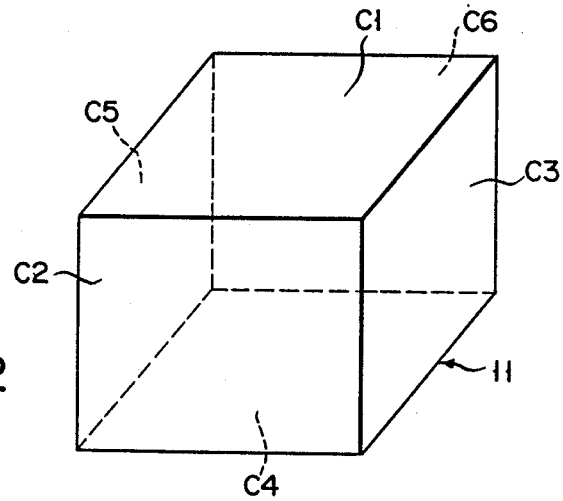

FIG. 1 illustrates an object 13, a 3D region 11 so set as to enclose the object, for example, a regular hexahedron or a cube, and a projection plane 12 in a desired view direction. Cube 11 has six faces C1 through C6 as shown in FIG. 2.

In the illustrated 3D coordinates (x, y, z), Ld is a normal drawn from a point Ps (x, y, z) on projection plane 12 toward cube 11 and C1 (x, y, z) is the cross point between Ld and one surface C1 of cube 11. Let Zd be the distance between the point Ps (x, y, z) and point C1 (x, y, z). Let Qs (x, y, z) be the cross point between object 13 and a line Ld1 which is an extension line from C1 (x, y, z), and let Zc be the distance between C1 (x, y, z) and this point Qs (x, y, z). In this case, object 13 exists on line Ld1, not Ld. In generating a depth map in 2D coordinates (x', y') on projection plane 12, therefore, once the view direction ($\rho$, $\theta$) is determined, the distance Z (x', y') between Ps (x', y') on projection plane 12 or Ps (x, y, z) and Qs (x, y, z) is expressed as:

$$Z(x', y') = \text{(Length of } Ld\text{)} + \text{(Length of } Ld1\text{)} \quad (1)$$
$$= Zd + Zc$$

The above can also apply to a case in which the cross point between normal Ld from Ps (x, y, z) and cube 1 exists on other face than C1 (i.e., any of C2–C6). Here, there simultaneously exist more than one cross point C (x, y, z) on projection plane 12 with respect to three or less of faces C1–C6, depending on the view direction (ρ, θ). There are eight types of cross points involving three faces.

C1 (x, y, z), C5 (x, y, z), C6 (x, y, z),
C1 (x, y, z), C2 (x, y, z), C3 (x, y, z),
C2 (x, y, z), C3 (x, y, z), C4 (x, y, z),
C4 (x, y, z), C5 (x, y, z), C6 (x, y, z),
C1 (x, y, z), C2 (x, y, z), C5 (x, y, z),
C1 (x, y, z), C3 (x, y, z), C6 (x, y, z),
C3 (x, y, z), C4 (x, y, z), C6 (x, y, z), and
C2 (x, y, z), C4 (x, y, z), C5 (x, y, z).

With respect to two faces, there are 12 types of cross points.

C1 (x, y, z), C2 (x, y, z),
C1 (x, y, z), C3 (x, y, z),
C1 (x, y, z), C5 (x, y, z),
C1 (x, y, z), C6 (x, y, z),
C2 (x, y, z), C3 (x, y, z),
C2 (x, y, z), C4 (x, y, z),
C2 (x, y, z), C5 (x, y, z),
C3 (x, y, z), C4 (x, y, z),
C3 (x, y, z), C6 (x, y, z),
C4 (x, y, z), C5 (x, y, z),
C4 (x, y, z), C6 (x, y, z), and
C5 (x, y, z), C6 (x, y, z).

With respect to one face, there are six types of cross points.

C1 (x, y, z),
C2 (x, y, z),
C3 (x, y, z),
C4 (x, y, z),
C5 (x, y, z), and
C6 (x, y, z).

Once the view direction (ρ, θ) is determined, the distance Zd is specifically determined, so is the cross point C (x, y, z) between Zd and cube 11. In any of the above cases, the ray tracing process needs to be executed with respect only to the distance Zc, and with Zc attained, the distance Z (x', y') can be attained from equation (1).

The reason why generation of a depth map in the conventional systems takes a significant time is that all the distances from projection plane 12 to object 13 are attained based only on a ray tracing algorithm which fails to distinguish a region where object 13 exists and a region where it does not exist. By contrast, according to the embodiment of this invention, the ray tracing algorithm is executed with respect only to the distance Zc from one surface of cube 11 to the surface of object 13, and the distance Zd between projection plane 12 and cube 11 can be attained through a simple coordinate computation. Therefore, a depth map can be generated at a high speed.

A specific description is now given of a depth map generating apparatus according to one embodiment of this invention based on the above principle.

As shown in FIG. 3, the depth map generation apparatus according to this embodiment comprises a 3D address generator 1, an image data memory 2, a detector 3, a counter 4, a depth map memory 5, a 2D address generator 6, an adder 7, a Zd memory 8 and an arithmetical and logical unit (ALU) 9. The address generator 1, detector 3 and counter 4 constitute a ray tracing processor 10.

Image data memory 2 stores 3D image data consisting a number of adjoining sliced images or voxels of a target body, which are collected by an image generating apparatus such as an X-ray CT apparatus or a magnetic resonance imaging (MRI) apparatus, in the form of binary data, either "0" or "1" depending on whether or not an object exists. The 3D image data, which normally consists of gradation data for each voxel, is converted into the binary data with a given gradation value as a threshold. 3D address generator 1 generates a 3D address for reading out the contents of image data memory 2. Counter 4 measures a clock pulse CP0, and detector 3 outputs a signal to stop the counting operation of counter 4 when data read out from image data memory 2 is "1." Ray tracing processor 10, constituted by address generator 1, detector 3 and counter 4, ascertains the distance Zc between one surface of 3D region (e.g., cube) 11 set to enclose object 13 and the surface of object 13 (see FIG. 2).

ALU 9 performs a coordinate computation to compute the distance Zd between the surface of cube 11 and projection plane 12, which is determined by the view direction (ρ,θ). The computed distance Zd is then written into Zd memory 8; the distance Zd stored in memory 8 can be accessed by address data D (x', y') corresponding to the 2D coordinates (x', y') on projection plane 12.

Adder 7 adds the counting output Zc of counter 4 and the output Zd of Zd memory 8. That is, adder 7 executes the computation of equation (1). The output Z (x', y') of adder 7 is then written in depth map memory 5; a write address of this memory 5 is generated by 2D address generator 6 in terms of 2D coordinates (x', y'). Counter 4, which is preset with a maximum value sufficiently larger than Z (x', y') for object 13, stops counting if detector 3 does not detect "1" when the count reaches the maximum value, and the maximum value is written directly (without going through adder 7) into depth map memory 5.

With the above arrangement, once the view direction (ρ, θ) is determined, the distance Zd is attained by ALU 9 and is written in Zd memory 8 in association with 2D coordinates (x', y'), thereby preparing a Zd table in memory 8. Since there is no object existing in the space between the surface of cube 11 and projection plane 12, the Zd table can be prepared at a high speed by a simple coordinate computation, not a comparatively slow ray tracing algorithm.

3D address generator 1 operates in synchronism with the clock pulse CP0. With Cs (x, y, z) being the start address of the initial value and v (Δx, Δy, Δz) being a 3D vector component (unit vector) in the view direction, the output R (x, y, z) of 3D address generator 1 can be expressed as:

$$R(x, y, z) = (x, y, z) + n \cdot v(\Delta x, \Delta y, \Delta z) \qquad (2)$$

where Cs (x, y, z), v (Δx, Δy, Δz) and R (x, y, z) are binary data and n is a positive integer representing the number of clock pulses CP0 repeated.

The coordinates (X, Y, Z) of image data memory 2 corresponding to R (x, y, z) can be expressed as:

$$X = Cs(x) + n\Delta x,$$

$$Y = Cs(y) + n\Delta y, \text{ and}$$

$$Z = Cs(z) + n\Delta z \text{ where Cs (x), Cs (y) and Cs (z) are}$$
the x−, y− and z-coordinates of the start address.

Data is read out from image data memory 2 by 3D address generator 1. When the read data is "1" (which means that the object is reached), detector 3 outputs a count disable signal which causes counter 4 to stop counting the clock pulse CPO. The distance between C (x, y, z) and Qs (x, y, z) is expressed as:

$$Zc = \sqrt{(n\Delta x)^2 + (n\Delta y)^2 + (n\Delta z)^2}$$
$$= n\sqrt{\Delta x^2 + \Delta y^2 + \Delta z^2}.$$

Based on the 2D address D (x', y') corresponding to 2D coordinates (x', y') of projection plane 12, the associated Zd is read out from Zd memory 8 and is added to the output Zc of counter 4 in adder 7, and the resultant value is written in depth map memory 5. When "1" is not detected by detector 3, the aforementioned, given maximum value is written in depth map memory 5. The above operation is performed for every point Ps (x', y')=Ps (x, y, z) on projection plane 12 to thereby preparing a depth map on projection plane 12 in depth map memory 5.

Needless to say, this invention is in no way limited to the particular embodiment described above and illustrated in the accompanying drawings, but it can be modified in various manners within the scope and spirit of the invention.

For instance, the 3D region 11 set to enclose object 13 may be a parallelepiped, a combination of a plurality of adjoining cubes, other polyhedron or a sphere as well as a cube. Since it is effective to set the 3D region enclosing object 13 as small as possible, it is desirable that the 3D region circumscribes object 13. The setting of the 3D region and the computation of ALU 9 may be facilitated by selecting a proper 3D region from among a variety of 3D regions of different preset sizes, such that it encloses object 13. The maximum value set in counter 4 for the case where the detection signal of detector 3 cannot be attained or the line of the ray tracing does not cross the object may be determined by the coordinates of the back face of a set 3D region, and when the count value exceeds the maximum value, a value corresponding to a preset background may be written in depth map memory 5.

What is claimed is:

1. A depth map generating apparatus comprising:
   a depth map memory for storing a depth map;
   three-dimensional (3D) region setting means for setting in 3D coordinates a 3D region of a given shape enclosing an object in 3D image data;
   first processing means for acquiring through a coordination computation a first distance measured in a desired view direction from a projection plane, a position of said projection plane being set in accordance with said desired view direction, said first direction measured to a surface of said 3D region, and said first processing means acquiring said first distance for each corresponding pixel on said projection plane;
   second processing means for acquiring through ray tracing a second distance measured in said desired view direction from said surface of said 3D region to a surface of said object, the second processing means acquiring a second distance for each corresponding pixel on said projection plane; and
   third processing means for adding said first and second distances for each corresponding pixel on said projection plane and writing resultant data in said depth map memory.

2. The apparatus according to claim 1, wherein said 3D region setting means sets a parallelepiped enclosing said object.

3. The apparatus according to claim 1, wherein said 3D region setting means sets a cube enclosing said object.

4. The apparatus according to claim 1, wherein said 3D region setting means sets a sphere enclosing said object.

5. The apparatus according to claim 1, wherein said 3D region setting means sets a 3D region circumscribing said object.

6. The apparatus according to claim 1, wherein said second processing means includes means for writing a given distance value in a corresponding pixel of said depth map without data processing in said third processing means when said object is not reached by a given range of ray tracing.

7. The apparatus according to claim 6, wherein said second processing means determines said given range of ray tracing in accordance with a position of a back face of said 3D region set by said 3D region setting means.

8. An apparatus for displaying a three-dimensional image, comprising:
   image data memory means for storing voxel data representing a three-dimensional object;
   processing means for obtaining total distances between points on a surface of said three-dimensional object and a projection plane orthogonal to a desired view direction, said processing means including:
   three-dimensional region determining means for determining a three-dimensional region enclosing said threedimensional object, whereby each of said total distances is divided into a first distance measured between said projection plane and the surface of said three-dimensional region and a second distance measured between the surface of said three-dimensional region and the surface of said threedimensional object,
   coordinate computation means for determining lengths of the first distances, with respect to each pixel on said projection plane, by coordinate computation,
   ray tracing means for determining lengths of the second distance with respect to each pixel on said projection plane by ray tracing, and
   adding means for adding the lengths of the first and second distances together to obtain each of said total distances, and
   displaying means for displaying an image on a twodimensional screen in a gradation corresponding to said total distances obtained by said adding means.

9. The apparatus according to claim 8, wherein said three-dimensional region determining means sets a cube enclosing said object.

10. The apparatus according to claim 8, wherein said three-dimensional region determining means sets a sphere enclosing said object.

11. The apparatus according to claim 8, wherein said three-dimensional region determining means sets a 3D region circumscribing said object.

12. The apparatus according to claim 8, wherein said processing means includes means for writing a given distance value in a corresponding voxel of said image data memory means without data processing in said adding means when said object is not reached by a given range of ray tracing.

13. The apparatus according to claim 8, wherein said processing means determines a given range of ray tracing in accordance with a position of a back face of said 3D region set by said three-dimensional region determining means.

* * * * *